Sept. 2, 1969        J. A. FREED        3,464,475
VEHICLE TUBES AND TIRES
Filed July 6, 1967        2 Sheets-Sheet 1
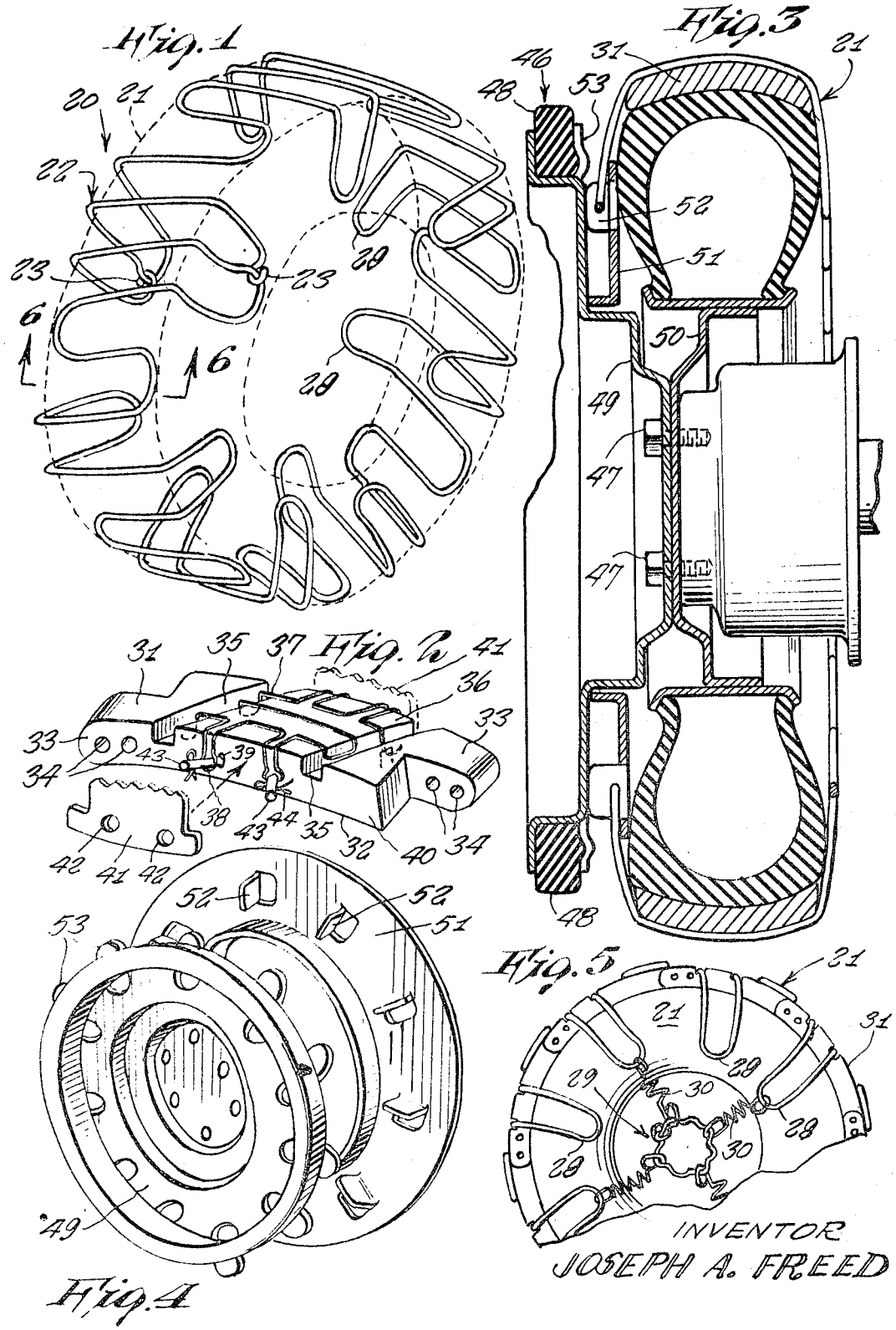
INVENTOR
JOSEPH A. FREED

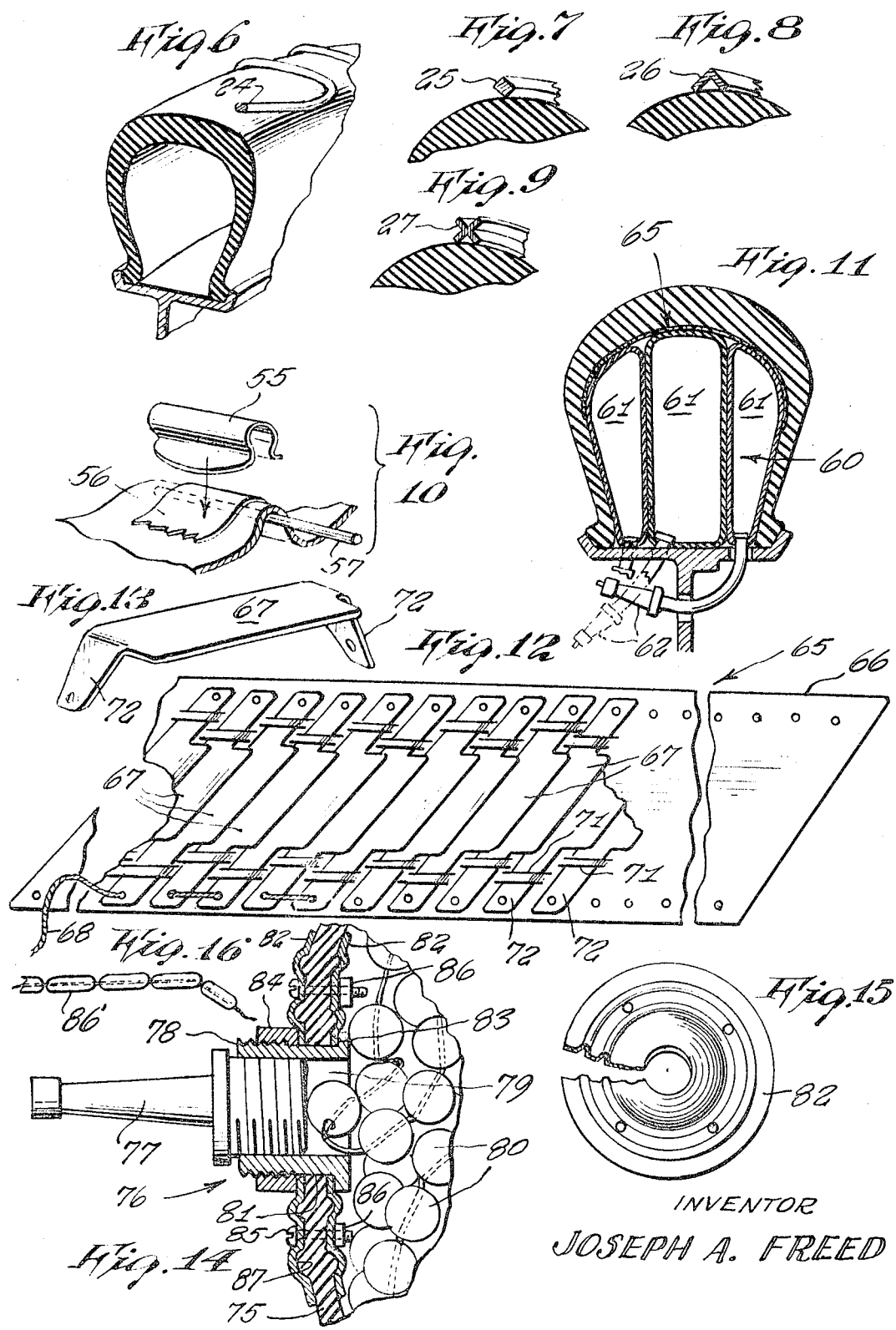

United States Patent Office 3,464,475
Patented Sept. 2, 1969

3,464,475
VEHICLE TUBES AND TIRES
Joseph A. Freed, 129 Ocean View Ave.,
Brooklyn, N.Y. 11235
Filed July 6, 1967, Ser. No. 651,942
Int. Cl. B60c 27/12, 17/04
U.S. Cl. 152—167                1 Claim

ABSTRACT OF THE DISCLOSURE

A set of accessories for an automobile tube and tire including an attachable wire tread to prevent skidding on ice; a compartmented tube and safety wheel to prevent a punctured wheel from collapsing, as well as an armor plate to shield a tube from puncturing objects.

---

This invention relates generally to automotive vehicle safety accessories.

A principal object of the present invention is to provide a set of safety accessories for automobile vehicles, including auxiliary wire treads for use on ice or wet roadways, a compartmented tube and an auxiliary safety wheel for preventing a punctured tire from collapsing and a flexible armour plate to shield a tube from puncturing objects that penetrate the tire.

Another object is to provide a set of safety accessories for automotive vehicles that further include a filler of elastic or plastic balls encased within a tube or tubeless tire to prevent the tire from collapsing in case of a puncture.

Yet another object is to provide a set of safety accessories for automotive vehicles that further includes a series of peripheral shoes that are removably attachable between the tire face and the attachable wire tread.

Yet another object is to provide an auxiliary safety wheel that could be secured on both sides of each automobile wheel.

Yet another object is to provide a safety tread which will prevent a wheel for splashing water, dust, mud, small rocks or broken bits of glass at pedestrains, or other objects.

Other objects are to provide a set of safety accessories for automotive vehicles which is simple in design, inexpensive to manufacture, rugged in construction, easy to use and efficient in operation.

These and other objects will be readily evident upon a study of the following specification and the accompanying drawing wherein:

FIGURE 1 is a perspective view of a wire tread securable over a tire,

FIGURE 2 is a perspective view of a shoe receivable between the tire and the wire tread, FIGURE 3 is a cross sectional view showing an auxiliary safety tire secured to a wheel, FIGURE 4 is a perspective view of parts thereof, FIG. 5 is a side view of a wheel showing the shoes and wire treads secured around a wheel, FIG. 6 is a fragmentary perspective cross sectional view showing a modified design of wire tread, FIG. 7 is a similar view showing a modified design of wire tread, FIG. 8 is a similar view of yet another design thereof, FIG. 9 is a similar view of yet another design thereof, FIG. 10 is a perspective view of a tire patching process that forms a part of this invention, FIG. 11 is a cross sectional view through a tire of further modified design, FIG. 12 is a fragmentary plan view of a tube shield that forms a part of the invention, FIG. 13 is a perspective view of one of the armor elements, FIG. 14 is a cross sectional view through a tube valve seat and showing a further element of the invention, FIG. 15 is an end view of one of the parts shown on FIGURE 14, and FIG. 16 is a side view of a series of plastic rollers or bars on a string for use as a flat tire filler.

Referring now to the drawing in detail, the reference numeral 20 represents a wire tread assembly that fits around a tire 21. The assembly 20 is comprised either from one or a plurality of arcuate segments 22 which are interconnected together at their ends as shown at 23.

The wire tread is formed of steel wire which may be circular in cross section as shown at 24 in FIGURE 6, or diamond shaped as shown at 25 in FIGURE 7, or angle shaped as shown at 26 in FIGURE 8, or cross shaped as shown at 27 in FIGURE 9. The portion of the wire which is over the tire tread and is engageable with the ground, is inclined diagonally instead of extending straight across the tire face. A loop 28 is formed at each alternate turn that folds down over a side of the tire and where it is engageable by a stretcher 29 shown in FIGURE 5, comprised of a configurated ring adjacent the outer side of the wheel hub, the ring being connected by springs 30 to the loops 28.

The structure of the wire tread will greatly improve the traction of the wheel upon ice, snow or wet road surface.

In another form of the invention, a series of blocks 31 may be fitted between the tire face and the wire tread.

The block 31 shown in FIGURE 2 is an arcuate member to conform to the wheel surface on its concave side 32; each block having an ear 33 at each end for interconnecting with an adjacent block. Openings 34 are for receiving connecting bolts. Diagonal grooves 35 on the outer side 36 are for receiving the wire assembly 20 therein. A wire grid 37 is fitted over the side 36; the wire having angular extending loops 38 for fitting adjacent the openings 39 on the edges 40 of the block. A pair of tooth plates 41 have openings 42 also aligned with the openings 39. Rods 43 are inserted through the openings 42, 39 and loops 38 and secured by cotter pins 44 at each end thus forming the assembly shown in FIGURE 2.

It shall be noted that the rods 43 criss-cross each other, and that the teeth 45 point radically outward on both plates so to bite into the ice surface.

The present invention includes an auxiliary safety wheel assembly 46 secured on the conventional wheel bolts 47; the wheel assembly 46 including a solid rubber tire 48 mounted on wheel 49 that is spaced from the outer side of conventional wheel 50 by a spaced disc 51 having struck out ears 52 that bear against wheel 46. Ears 53 struck on wheel 46 form a side wall to secure the tire on the wheel.

In case of a flat tire occurring on wheel 50, the car will drop only slightly and ride temporarily on tire 48 until the inflated tire is fixed.

The wheel assembly could be mounted on both sides of each wheel, where space permits it, for greater safety.

In FIGURE 10, a novel method of tire patching is shown wherein a clip 55 is snapped over a tire patch 56. A rod 57 is on the outer side of the tire.

As shown in FIGURE 11, a tire may be fitted with a compartmented inner tube 60 having separate air compartments 61, each of which is separately inflated by its own valve 62. In case one compartment is punctured, the other compartments keep the tire from collapsing, thus allowing a car to continue going until it arrives at a repair station.

If preferred, in normal use only one of the compartments is inflated, and the other compartments are kept uninflated until needed in case the inflated compartment gets a flat.

In FIGURES 12 and 13 a flexible armor plate assembly 65 is shown that fits between the tire and tube so to prevent any sharp object that penetrates the tire to also penetrate the tube. The assembly includes a leather or plastic sheet 66 to which a plurality of spring steel plates 67 are stitched by a wire 68 through openings 69 and 70 of the parts. Loops 71 in the leather receive tapered ends 72 of the plates.

The wire tread 20 may be made of relatively very thick wire whereby the tire surface or shoe surface will at all times be spaced from the road surface, thereby not causing the tire to splash water or mud on pedestrains, other cars, windows and doors of houses near the road, or even on the same car itself.

In FIGURES 14 to 16, a tube 75 is shown having a special valve seat 76 for holding a valve 77. The seat comprises a bushing 78 having a large enough central threaded opening 79 so to permit feeding a string of spherical marbles 80 thereinto, after unscrewing the valve, in case the tire gets a flat. The tube has an opening 81 for receiving the valve bushing, a pressure plate 82 being placed against each side of the tube which assembly is then placed against a flange 83 of the bushing and secured by a nut 84. Rivets or bolts 85 and nuts 86 secure the pressure flats together. As shown in FIGURE 16, short bars 86' may be used instead of marbles to fill the tube. The marbles or bars will support the tire from flattening in case of a flat, thus allowing travel to continue to a service station.

Each pressure plate 82 has oppositely opposed circular grooves between which the tube rubber is grasped, the tube having corresponding circular ridges which fit into the grooves.

While various changes may be made in the detail construction, such changes will be within the spirit and scope of the appended claim.

I claim:

1. In a vehicle safety accessory set for tube and tire, the combination of a wire tread securable around a tire, said tread comprising a wire disposed in diagonally transverse legs across a face of said tire, loops formed in said wire tread adjacent each side of said tire, said loops on the outer side of said tire being grasped by a spring loaded stretcher, a plurality of interconnected blocks being fitted between said wire tread and said tire face, said blocks having diagonal cross grooves on their outer side so to receive said legs of said wire tread, and an individual wire grid being secured over the outer side of each said block, and a toothed plate being secured adjacent each side of each block.

References Cited

UNITED STATES PATENTS

| | | | |
|---|---|---|---|
| 483,344 | 9/1892 | Bullard | 152—206 |
| 852,130 | 4/1907 | Magowan | 152—317 |
| 924,806 | 6/1909 | Lyon | 152—225 |
| 1,783,091 | 11/1930 | Leupold | 152—340 |
| 2,191,392 | 2/1940 | Huarte | 301—40 |
| 2,559,425 | 7/1951 | Haracz | 152—225 |
| 3,079,971 | 3/1963 | Iaquinta | 152—179 |

ARTHUR L. LA POINT, Primary Examiner

CHARLES B. LYON, Assistant Examiner

U.S. Cl. X.R.

152—206, 227